April 23, 1940.   H. F. VICKERS   2,197,819
ANTIKICKBACK DEVICE
Filed Sept. 30, 1937   3 Sheets-Sheet 1
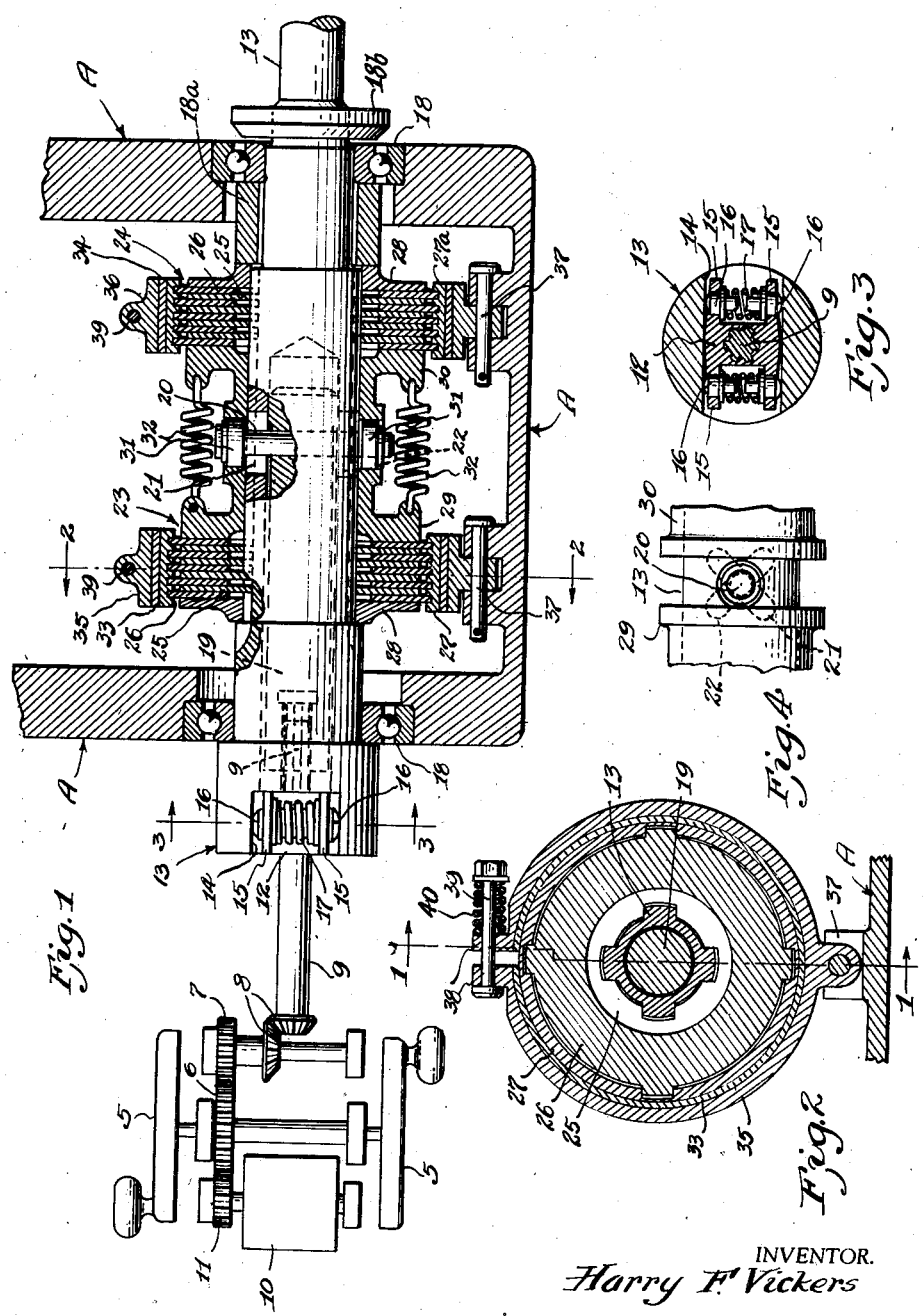
INVENTOR.
Harry F. Vickers
BY
Barnes, Kisselle, Laughlin & Raisch
ATTORNEY.

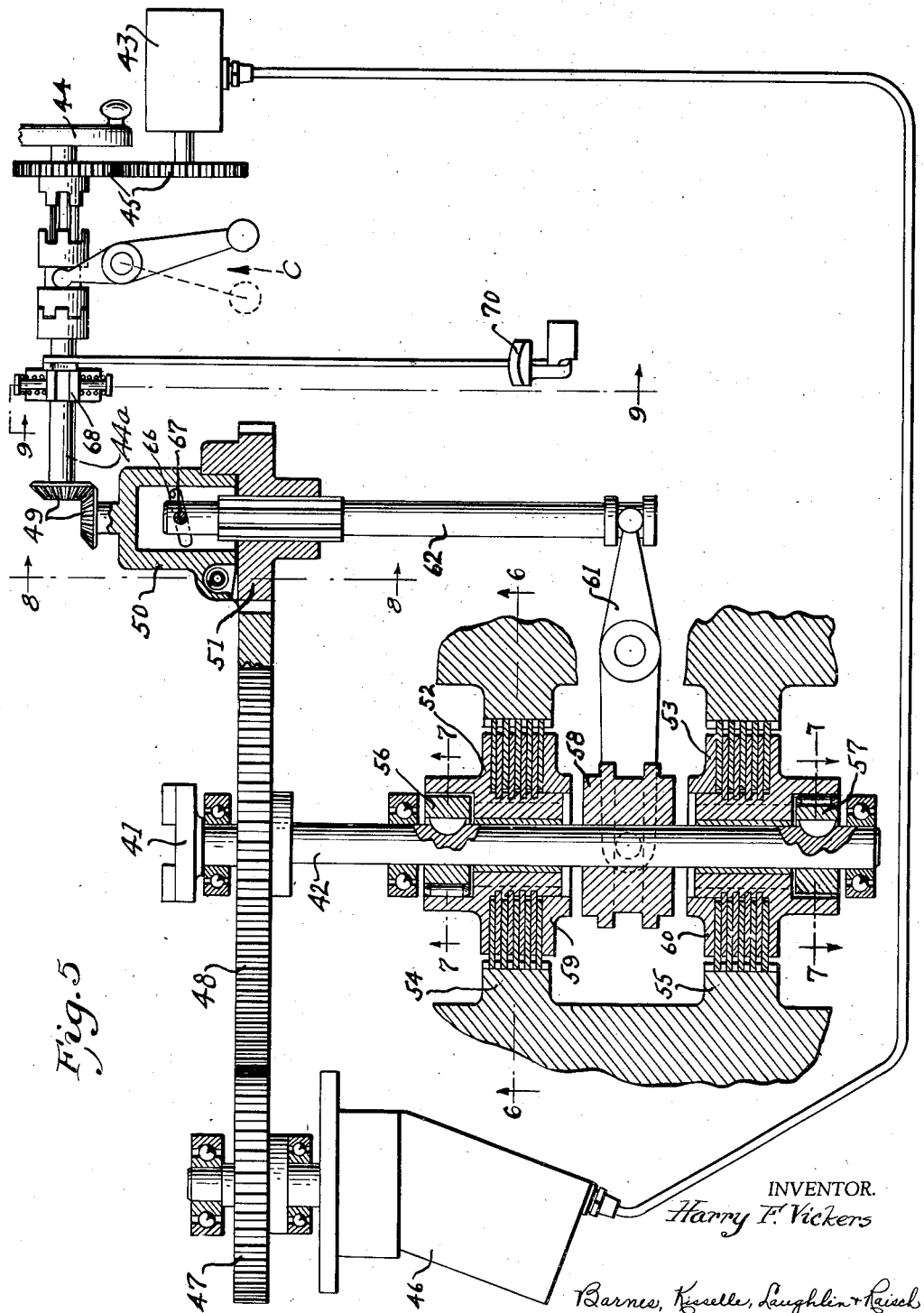

April 23, 1940.  H. F. VICKERS  2,197,819
ANTIKICKBACK DEVICE
Filed Sept. 30, 1937  3 Sheets-Sheet 3
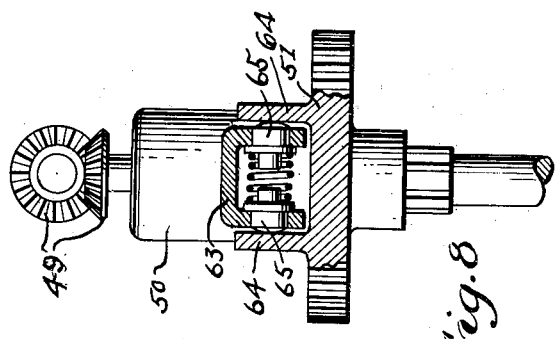
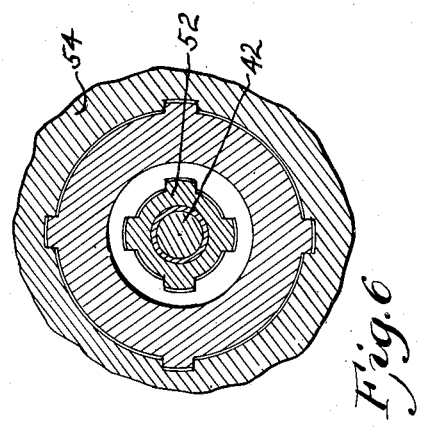
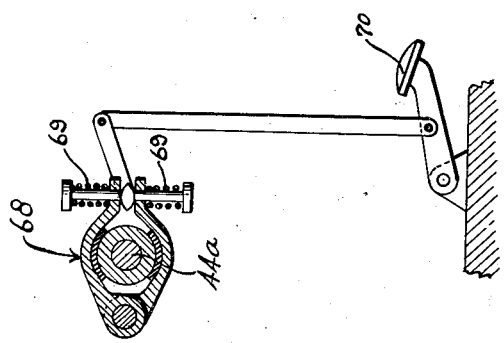
INVENTOR.
Harry F. Vickers
BY
Barnes, Kisselle, Laughlin & Raisch
ATTORNEYS.

Patented Apr. 23, 1940

2,197,819

UNITED STATES PATENT OFFICE 2,197,819

ANTIKICKBACK DEVICE

Harry F. Vickers, Detroit, Mich., assignor to Vickers, Incorporated, Detroit, Mich., a corporation of Michigan Application September 30, 1937, Serial No. 166,475

12 Claims. (Cl. 188—134)

This invention relates to an antikickback device and more particularly to a device for preventing sudden fluctuations of a power shaft from being translated to the source of power whether it be manual or mechanical.

The object of this invention is to furnish a device which may be placed in a rotating power shaft to substantially prevent sudden fluctuations or kickbacks from being transferred along said power shaft to the power source.

Briefly, this is accomplished by operably connecting said power shaft at one portion with clutches in such manner that the clutches will be engaged by any sudden jerk or twist of the power shaft. The engaging of these clutches tends to turn the outer clutch rings which are held from turning by a brake band of predetermined adjustment. This braking action serves to absorb the kick of the power shaft and to prevent noticeable shock from being translated from the power shaft to the power source whether it be a motor or manual power.

The invention is especially adapted for use with manually controlled follow-up devices which are used to translate manual motion into power motion, said devices being mostly used to move large masses such as dirigible wheels or rudders. It will be seen, however, that the invention might be used on any shaft where sudden torques or twists were objectionable, as for instance, in a power shaft between an actuating motor and a large mass when said mass is subject to sudden shocks which might normally injure the motor.

The following detailed description discloses the invention as used with a manually controlled drive shaft.

In the drawings:

Fig. 1 is a partially sectional longitudinal view of the invention showing detail structure and its relation to the hand wheel mechanism and drive shaft.

Fig. 2 is a transverse cross-section of the structure shown in Fig. 1, taken on line 2—2.

Fig. 3 is a similar cross-sectional view taken on line 3—3.

Fig. 4 is a plan view of a small portion of the mechanism showing relation of the connecting pin to the angular slots in the drive shaft.

Fig. 5 is a second modification of the invention as used with a hydraulic follow-up device.

Fig. 6 represents a cross-section through a clutch of Fig. 5 and is taken on line 6—6.

Fig. 7 is a cross-section, on line 7—7, of a free wheeling clutch of Fig. 5.

Fig. 8 is a detail drawing of the centering device of Fig. 5 taken on line 8—8 thereof.

Fig. 9, taken on line 9—9 of Fig. 5, shows detail of a foot brake.

One embodiment of the invention is illustrated in Figs. 1 to 4. In Fig. 1 manual power is furnished through hand wheels 5, reduction gears 6 and 7, and bevel gears 8 to the shaft 9. The hand wheels and gears are suitably mounted in bearings and an inertia governor or flywheel 10 is operatively connected to gear 6 by a gear 11. Rigidly mounted on shaft 9 is a spring block 12, a cross-section of which is shown in Fig. 3. This block 12 is substantially rectangular in cross-section and fits into a power shaft 13 which is provided with a transverse slot 14 in its end for receiving said block. The block 12 is provided with angular sides which bear on the parallel sides of slot 14 midway between ends of said block as shown in cross-section in Fig. 3.

The block is cut each way from the bearing line on an angle so that the out portions of the block are narrower than the portion at the bearing line. This will permit a small degree of rotation of the block 12 relative to the shaft 13 and within the slot 14. In each end of the spring block 12 is an axial groove formed by the extending sides 15. Projecting through oppositely positioned holes in each of these sides 15 are flanged buttons urged outwardly by springs 17. Still referring to Fig. 3, it will be seen that these buttons 16 are so designed that they normally contact the parallel surfaces of slot 14 and prevent rotation of shaft 9 relative to shaft 13. Shaft 13 is suitably mounted in the housing A by bearings 18, a spacer 18a and a retaining nut 18b.

Slidably and rotatably fitted in an axial hole in the end of shaft 13 is a shaft 19 which is slidably splined to shaft 9. Extending transversely through a hole in shaft 19 is a pin 20 which also extends transversely through angular slots 21 and 22 provided in shaft 13. The angular relationship of said slots is best shown in Fig. 4.

Two clutch mechanisms 23 and 24 coaxial with shaft 13 are positioned one on either side of pin 20. These clutch mechanisms consist of inner friction discs 25 which are slidably splined to shaft 13, outer friction discs 26 rigidly held in clutch rings 27—27a, end plates 28 at each end of the clutch mechanisms, and actuating plates 29 and 30 freely mounted on shaft 13. On each end of the pin 20 which projects through shaft 13 is mounted a roller 31 which bears on the inner faces of clutch actuating plates 29 and 30 and serves to keep said plates in spaced relationship against the action of springs 32 which urge said actuating plates mutually toward each other and away from operative position as respects the clutch mechanisms.

The outer peripheries of clutch rings 27—27a serve as braking surfaces upon which bear brake bands 33—34 held in place by open brake shoes 35—36 which are mounted on the housing A by a pin pivot arrangement illustrated generally at 37. The open ends of the brake shoes 35—36 are provided with outwardly extending lugs 38 which have a bolt 39 projecting therethrough and a spring 40 to hold said brake shoes and bands 33—34 against clutch rings 27—27a with a predetermined pressure.

The operation is as follows: When torque is applied to shaft 9 through the hand wheels 5, reduction gears 6 and 7 and bevel gears 8, springs 17 will normally take the load and serve to maintain a fixed relation between block 12 and shaft 13. The torque in shaft 9 will thereby be directly transmitted to shaft 13. If, however, there is a sudden increase in the load on the shaft 13, due to kickback, springs 17 will tend to compress thereby allowing angular movement between the shafts 9 and 13. Due to this arrangement there could be no shock transmitted to the hand wheels 5 until the angular faces of block 12 contact the parallel sides of the slot 14 and the end of shaft 13. Meanwhile, the angular movement of shaft 9 with respect to the shaft 13 has also turned shaft 19 which is slidably splined to the end of shaft 9. This rotation of shaft 19 will also turn the pin 20 which in turning must follow the angular slots 21—22 in shaft 13. Because of these angular slots the pin 20 will be moved to the right or left, as shown in Fig. 1, depending on the direction of rotation.

This movement of pin 20 with respect to shaft 13 will cause movement of one of the clutch actuating plates 29 and 30 thereby engaging clutch mechanisms of the actuating plates. For example, if rotation is such that clutch mechanism 23 is engaged the outer friction discs 26 will tend to rotate clutch ring 27. This rotation will be resisted by the pressure of the brake band 33 and the shoe 35. Said pressure having been predetermined by setting of spring 40.

The kickback energy built up in the shaft 13 will be substantially absorbed in the braking action between ring 27 and the brake band 33 with only a slight amount going back to the hand wheels 5. When this kickback energy is spent, spring 17 will tend to expand thereby positioning block 12 in its normal relation with shaft 13 and disengaging the clutch mechanism 23 by reason of the pin 20 and the clutch plate 29 also assuming normal position.

It will be seen that the clutch and braking mechanism will absorb normal fluctuations in the rotation of shaft 13, whether those fluctuations are caused by sudden increases or sudden decreases in the torque load on said shaft.

A second embodiment of the invention, which is a modification of the mechanism illustrated in Fig. 1, is shown in Fig. 5. A coupling 41 is connected to a mechanism which trains or elevates a gun or actuates any mechanism requiring resistance to outside force similar to gun recoil. The coupling 41 is mounted on a shaft 42 which may be driven in two ways. First, the shaft may be driven by a hydraulic follow-up device which consists of a remote control 43 driven by a handwheel 44 and gears 45 and hydraulically connected to a variable piston displacement motor 46, which drives a gear 47 and in turn a gear 48 on the shaft 42. The shaft 42 may also be manually actuated by the handwheel 44, shaft 44a, bevel gears 49, housing 50, and gear 51 which engages gear 48. A change over mechanism indicated generally at C is used to connect the handwheel 44 to the gears 45 for remote control or to gears 49 for manual control. In the full line position shown, the mechanism C is ready for manual control.

Coaxial with the workshaft 42 are braking mechanisms which consist of sleeves 52 and 53, rotatable on the shaft 42, and of stationary mountings 54 and 55 which hold stationary braking discs adapted to engage discs held in the sleeves 52 and 53. These sleeves are each separately connected to the shaft 42 by free wheeling clutches 56 and 57 which allow the sleeves to be rotated in one direction only on the shaft 42. For example, the shaft 42 can rotate in a clockwise direction with respect to the sleeve 52 and can only rotate in a counterclockwise direction with respect to the sleeve 53. The brake sleeves 52 and 53 are normally free to rotate and may be engaged by the action of a sleeve 58, coaxial with the shaft 42, which presses against brake actuating discs 59 and 60 to engage the brakes.

This sleeve 58 is actuated by a lever 61 which in turn is actuated by a reciprocating shaft 62 to which the gear 51 is slidably splined. The housing 50 and the gear 51 are maintained in a definite relationship with respect to each other by a centering device best illustrated in Fig. 8. It consists of interfitting lug portions 63 and 64 on the housing 50 and gear 51 respectively, with spring pressed buttons 65 extending through each side of the lug portion 63 to contact the inner faces of the lug portions 64 and permit slight relative movement between gear 51 and housing 50. The housing 50 is also provided with a helical slot 66 which engages a cross pin 67 in the shaft 62 such that relative rotary movement between housing 50 and gear 51 will reciprocate the shaft 62 in the splines of the gear 51.

In the operation of this modified embodiment of the invention, the turning of the handwheel 44 will result in relative movement between housing 50 and gear 51. Shaft 62 and lever 61 will be actuated by the movement of the pin 67 in the slot 66 and sleeve 58 will contact one of the brake actuating discs 59 or 60 depending on the direction of rotation of the handwheel. The hand power will be transferred through gear 51 to gear 48 and the coupling 41 until there is a kickback. One of the free wheeling clutches will then grab the shaft 42 and brake the kickback action. For example, assuming that the brake 52 is engaged by upward movement of the sleeve 58, the cross-sectional view of the free-wheeling clutch in Fig. 7 shows that the shaft 42 can rotate in a clockwise direction with respect to the brake sleeve 52 but that any "kickback" movement of the shaft 42 in a counterclockwise direction would be absorbed by the brake discs between sleeve 52 and the collar 59. Any tendency of the shaft 42 to overtake the handwheel motion will result in a shifting of the housing 50 with respect to the shaft 62. Shaft 62 will be shifted upward and brake disc 60 will then be contacted by sleeve 58, and the brake sleeve 53 cooperating with the freewheeling clutch 57 will absorb the "kick-ahead" or "overhaul" motion of the work shaft 42.

A brake 68 maintains a friction hold on the handwheel shaft sufficient to engage either brake 52 or 53 while the operator is not holding the wheel. The brake is held in engagement by springs 69 (Fig. 9) and is released by depression of pedal 70. In order to operate the shaft 42 either by remote control or by manual control it is necessary to depress the pedal 70 to release the handwheel shaft 44a.

What I claim is:

1. An antikick reversible control comprising a power output shaft, a power input shaft, a spring resisted, limited yieldable connection arranged to permit a resisted relative movement in either direction between said shafts, brake means normally independent of said shaft and adapted, when actuated, to engage said output shaft, and means operably connected to said input shaft for actuating said brake means when said limited yieldable connection between said shafts is taken up.

2. An antikick reversible control comprising a power output shaft, a power input shaft, said shafts being adapted to be rotated in either direction, brake means adapted, when actuated, to engage said output shaft, a yieldable drive connection between said input and output shafts independent of said brake means, and means connected to said yieldable drive connection for actuating said brake means when said output shaft is subjected to sudden rotary impulses in either direction.

3. A mechanical power control device adapted to prevent transmission of sudden torque impulses from a power output shaft to the power source, comprising a power input shaft, a power output shaft, a positioning means connecting said shafts to permit limited relative rotation in either direction therebetween, frictional braking means normally independent of said shafts, and means to engage said brake means and said output shaft when said output shaft is subjected to sudden torque impulses in either direction.

4. A mechanical power control device adapted to prevent transmission of sudden torque impulses from a power output shaft to the power source, comprising a power output shaft, a power input shaft, an inertia governor operably connected to said input shaft, a positioning means connecting said shafts to permit limited relative rotation in either direction therebetween, frictional braking means normally independent of said shafts, and means operably connected to said input shaft and adapted to be engaged by relative motion in either direction between said shafts, said last named means serving to operably connect said output shaft and said brake means when said output shaft is subjected to sudden torque impulses in either direction.

5. A mechanical power control device adapted to prevent transmission of sudden torque impulses from a power output shaft to the power source comprising a power output shaft, a power input shaft coaxial with said output shaft and telescoped therein, a positioning means connecting said shafts to permit limited relative rotation in either direction between said shafts, braking means normally independent of said shafts, means to operably connect said braking means and said output shaft, and means on said input shaft and means on said output shaft for effecting engagement of said brake connecting means upon relative movement in either direction between said shafts.

6. A mechanical power control device adapted to prevent transmission of sudden torque impulses from a power output shaft to the power source comprising a power output shaft, a power input shaft coaxial with said output shaft and telescoped therein, a lost motion positioning means connecting said shafts to permit limited relative rotation between said shafts, spring means tending to normally resist said relative movement, braking means, comprising spaced discs coaxial with and fixed to rotate with said output shaft and stationary discs interposed between said spaced discs, means to operably connect said braking means and said output shaft, and means on said input shaft and means on said output shaft for engaging said brake connecting means when said spring means is overcome by sudden torque impulses in either direction on said output shaft.

7. A mechanical power control device adapted to prevent transmission of sudden torque impulses from a power output shaft to the power source comprising a power output shaft, a power input shaft coaxial with said output shaft and telescoped therein, a lost motion positioning means connecting said shafts to permit limited relative rotation between said shafts, spring means tending to normally resist said relative movement, braking means, means to operably connect said braking means and said output shaft, and transverse pin means on said input shaft, said output shaft having helical slots adapted to receive said pin means whereby relative rotary movement of said shafts will engage said brake connecting means.

8. A mechanical power control device adapted to prevent kickback and overhaul forces on a power shaft comprising, a power output shaft, a power input shaft adapted to control the rotation of said output shaft, a series of gears operably connecting said shafts, a limited yieldable connection between certain of said gears, braking units on said output shaft, free wheeling clutch means operably connecting each of said braking units to said output shaft, and brake actuating means operably connected to said gears whereby the direction of rotation of said input shaft determines which braking unit is actuated, said brake actuating means normally engaging one of said braking units during rotation to brake kickback impulses on said output shaft, and adapted to engage said other brake unit in case of a sudden overhaul impulse on said output shaft to brake overhaul impulses.

9. A mechanical power control device adapted to prevent kickback and overhaul forces on a power shaft comprising, a power output shaft, a power input shaft adapted to control the rotation of said output shaft, means operably connecting said shafts, a limited yieldable connection included in said means, braking units on said output shaft, free wheeling clutch means operably connecting each of said braking units to said output shaft, said braking units and clutches being adapted when engaged, to brake said output shaft in opposite directions, and brake actuating means operably connected to said first named means comprising a cam rod adapted to be shifted by relative movement between said shafts permitted by said yieldable connection, and means responsive to the shifting of said rod by actuation of said input shaft for normally engaging one of said braking units to render the same effective to brake kickback impulses on said output shaft, said last named means being also responsive to the shifting of said rod when said output shaft is subjected to overhauling impulses to engage said other braking unit.

10. A mechanical power control device adapted to prevent kickback and overhaul forces on a power shaft comprising, a power output shaft, a power input shaft adapted to control the rotation of said output shaft, a gear on said input shaft, a gear on said output shaft, and a unit operably connecting said gears comprising a first gear engaging said output shaft gear, a second gear engaging said input shaft gear, and means forming a yieldable connection between said first and second gears whereby to permit limited relative rotation between said first and second gears, braking units adapted to act on said output shaft, freewheeling clutch means operably connecting each of said braking units to said output shaft, said braking units and clutches being adapted when engaged, to brake said output shaft in opposite directions, and brake actuating means comprising a cam rod operably connected to said first and second gears whereby relative rotation of the same will shift said rod, and means responsive to shifting of said rod for normally engaging one of said braking units to brake kickback impulses on said output shaft, said last named means being adapted to engage said other braking unit when said output shaft is subjected to overhauling impulses.

11. A mechanical power control device adapted to prevent kickback and overhaul forces on a power shaft comprising, a power output shaft, braking units adapted to act on said shaft, freewheeling clutch means operably connecting each of said braking units to said output shaft, said braking units and clutches being adapted when engaged, to brake said output shaft in opposite directions, an input shaft, means operably connecting said shafts independent of said braking units, and brake actuating means operably connected to said shaft connecting means whereby operation of said input shaft causes engagement of one of said braking means to brake kickback impulses on said output shaft, said brake actuating means being also adapted to engage said other braking unit when said output shaft is subjected to overhauling impulses.

12. A mechanical power control device adapted to prevent kickback and overhaul forces on a power shaft comprising, a power output shaft, braking units adapted to act on said shaft, freewheeling clutch means operably connecting each of said braking units to said output shaft, said braking units and clutches being adapted when engaged, to brake said output shaft in opposite directions, an input shaft, means operably connecting said shafts independent of said braking units, and brake actuating means operably connected to said shaft connecting means comprising a cam rod adapted to be shifted when said input shaft is rotated and when said output shaft is subjected to overhauling impulses, and means responsive to the shifting of said rod by rotation of said input shaft for normally engaging one of said braking units to render the same effective to brake kickback impulses on said output shaft, said last named means being adapted to engage said other braking unit when said rod is shifted by reason of said output shaft being subjected to overhauling impulses.

HARRY F. VICKERS.